Patented Feb. 24, 1953

2,629,727

UNITED STATES PATENT OFFICE 2,629,727

ORGANOSILYL ALCOHOLS

John L. Speier, Pittsburgh, Pa., assignor to Dow Corning Corporation, Midland, Mich., a corporation of Michigan No Drawing. Application July 26, 1950, Serial No. 176,071

5 Claims. (Cl. 260—448.2)

This invention relates to triorganosilyl alcohols.

It is an object of this invention to prepare novel compositions of matter which are useful as intermediates in the preparation of organosilicon polymers, emulsifiers, and detergents. Another object is to prepare alcohols which are useful as insecticides.

This invention relates to compounds of the formula $R_aSi[(CH_2)_bOH]_{4-a}$ where $a$ is 2 to 3, $b$ is 3 to 5, and R is selected from the group consisting of alkyl and phenyl radicals.

The compounds of this invention are prepared by reacting (chloroalkoxy)silanes of the formula $R_3SiO(CH_2)_bCl$ with metals such as sodium, lithium, and magnesium. The precise manner in which the reaction proceeds to give the alcohols varies with the reactivity of the metal employed and with the temperature of the reaction. In general, sodium and lithium cause rearrangement at temperatures of 30° C. and above, while with magnesium, rearrangement takes place at an appreciable rate only above 55° C. The reaction is represented by the equation $$R_3SiO(CH_2)_bCl + M \rightarrow R_3Si(CH_2)_bOM$$

Upon hydrolysis, the corresponding alcohol is formed.

A second method of preparing the compounds of this invention is by reacting the (chloroalkoxy)silanes, the metal, and a triorganochlorosilane. This reaction proceeds according to the equation $$R'_3SiO(CH_2)_bCl + R_3SiCl + M \rightarrow R'_3SiO(CH_2)_bSiR_3$$

The resulting product is then hydrolyzed to produce the desired alcohol and a hexaorganodisiloxane.

The (chloroalkoxy)silanes employed in this invention are prepared by reacting silanes of the formula $R_aSiCl_{4-a}$ where $a$ is 2 or 3, with a chloroalcohol of the formula $HO(CH_2)_bCl$. This reaction is best carried out in the presence of a hydrogen halide acceptor such as ammonia, pyridine, or other organic amines. The reaction is preferably carried out at a temperature below 30° C. and, if desired, a solvent inert to chlorosilanes may be employed. Such solvents include benzene, hexane, diethylether, and the like.

The compounds of this invention include those in which R is any alkyl radical or a phenyl radical. Thus, for example, R is methyl, ethyl, octadecyl, or phenyl.

The following examples are illustrative only and are not to be construed as limiting the invention.

Example 1

95.5 g. of bis(3-chloropropoxy-1)dimethylsilane was mixed with 97 g. of trimethylchlorosilane and reacted with 60 g. of molten sodium in 200 cc. of xylene containing 60 g. of trimethylchlorosilane. A vigorous reaction occurred, upon completion of which the mixture was filtered. The product was distilled to remove excess chloromethylsilane and xylene. After this, the residue was diluted with 175 cc. of acetone and hydrolyzed by heating with water and hydrochloric acid. The mixture was distilled and after removal of the solvent there was obtained bis(3-propanol-1)dimethylsilane, $$(CH_3)_2Si[(CH_2)_3OH]_2$$

boiling point 176° C. at 24 mm., $n_D^{25°C.}$ 1.4630, $d_4°c.^{25°C.}$ .9378, and specific refraction .2937.

Example 2

106 g. of 3-chloropropoxy-1-trimethylsilane was added slowly to a rapidly stirred suspension of 30 g. of molten sodium in 200 ml. of refluxing toluene. When reaction was complete the mixture was cooled, and after destruction of the excess sodium by water, hydrochloric acid was added to neutralize the alkali and alkoxides present. The mixture was filtered, dried, and distilled to give 3-trimethylsilylpropanol-1, $$(CH_3)_3Si(CH_2)_3OH$$

boiling point 81° C. to 82° C. at 24 mm., $n_D^{25°C.}$ 1.426, $d_4°c.^{25°C.}$ .826, and specific refraction .3109.

Example 3

116 g. of 4-chlorobutoxy-1-trimethylsilane was added to 16.5 g. of magnesium chips in absolute diethylether. After almost all the magnesium had dissolved the ether was removed and the residue heated at 60° C. overnight. The reaction mixture was then a solid white material which was dissolved in dilute hydrochloric acid. An insoluble liquid layer separated which, upon distillation, gave 4-trimethylsilylbutanol-1, $$(CH_3)_3Si(CH_2)_4OH$$

boiling point 96° C. at 26 mm., $n_D^{25°C.}$ 1.4315, $d_4°c.^{25°C.}$ .830, and specific refraction .3122.

Example 4

The procedure of Example 3 was repeated using 114 g. of 5-chloropentoxy-1-trimethylsilane. After all the magnesium had dissolved, the ether was removed and the residue heated at a temperature of 128° C. to 150° C. overnight. Upon neutralizing the residue and distilling, 5-trimethylsilylpentanol-1, $(CH_3)_3Si(CH_2)_5OH$ was obtained, boiling point 111° C. at 24 mm., $n_D^{25°C.}$ 1.4358, $d_4°C.^{25°C.}$ .841.

Example 5

A mixture of 129 g. of 3-chloropropoxy-1-ethyldimethylsilane and 88 g. of ethyldimethylchlorosilane was added slowly with stirring to 33 g. of molten sodium in 200 cc. of refluxing toluene. The reaction mixture was filtered and distilled, whereupon there was obtained 3-ethyldimethylsilylpropoxy-1-ethyldimethylsilane, $$C_2H_5(CH_3)_2Si(CH_2)_3OSiC_2H_5(CH_3)_2$$

boiling point 115° C. at 25 mm.

This compound was hydrolyzed to give the alcohol 3-ethyldimethylsilylpropanol-1, $$C_2H_5(CH_3)_2Si(CH_2)_3OH$$

boiling point 101° C. at 25 mm., $n_D^{25°C.}$ 1.4370, $d_4°C.^{25°C.}$ .8387.

Example 6

Using the procedure of Example 5, 5-chloropentoxy-1-ethyldimethylsilane, ethyldimethylchlorosilane and Na were reacted in the molar ratio of 1:1:2. The resulting product was $$C_2H_5(CH_3)_2Si(CH_2)_5OSi(CH_3)_2C_2H_5$$

which upon hydrolysis gave diethyltetramethyldisiloxane and 5-ethyldimethylsilylpentanol-1, $C_2H_5(CH_3)_2Si(CH_2)_5OH$. This alcohol has a boiling point of 124° C. at 24 mm., $n_D^{25°C.}$ 1.4421, and $d_4°C.^{25°C.}$ .838.

Example 7

When 1 mol of 5-chloropentoxy-1-phenyldimethylsilane is reacted with 2 mols of lithium in hexane at room temperature until the lithium is dissolved and the mixture is then washed with dilute hydrochloric acid and distilled, 5-phenyldimethylsilylpentanol-1, $C_6H_5(CH_3)_2Si(CH_2)_5OH$ is obtained.

Example 8

72 g. of 5-chloropentoxy-1-trimethylsilane was added slowly to 5 g. of clean lithium metal in 200 cc. of dry hexane. When the lithium had practically disappeared, the mixture was washed out with dilute acid and distilled. 5-trimethylsilylpentanol-1 was obtained, b. p. 109° C. at 24 mm. $n^{25°C.}$ 1.433–1.435.

That which is claimed is:
1. $(CH_3)_3Si(CH_2)_bOH$ where $b$ has a value from 3 to 5.
2. $C_2H_5(CH_3)_2Si(CH_2)_3OH$.
3. $C_2H_5(CH_3)_2Si(CH_2)_5OH$.
4. $(CH_3)_3Si(CH_2)_4OH$.
5. A compound with the formula $R_3Si(CH_3)_bOH$ where $b$ has a value of from 3 to 5 inclusive and R is an alkyl radical.

JOHN L. SPEIER.

REFERENCES CITED

The following references are of record in the file of this patent:

Niedielski, "Jour. Am. Chem. Soc.," vol. 69, page 3519 (1940).

Sommer et al., "Jour. Am. Chem. Soc.," vol. 71, pp. 3056–60 (1949).

Swain, "Jour. Am. Chem. Soc.," vol. 71, page 965 (1949).